Patented July 14, 1953

2,645,669

UNITED STATES PATENT OFFICE 2,645,669

HYDROGEN TRANSFER PROCESS

Herman Pines and Vladimir N. Ipatieff, Chicago, Ill., assignors to Universal Oil Products Company, Chicago, Ill., a corporation of Delaware No Drawing. Application February 23, 1950, Serial No. 145,904

19 Claims. (Cl. 260—668)

This application is a continuation-in-part of our co-pending application Serial Number 788,642 filed November 28, 1947, now abandoned.

This invention relates to a process for effecting hydrogen transfer reactions and particularly for producing fused ring polycyclic hydrocarbons from fused ring bicyclic or polycyclic hydrocarbons in which one ring is aromatic while another ring is completely hydrogenated.

An object of this invention is to produce a polycyclic hydrocarbon with two aromatic rings.

Another object of this invention is to condense with itself a hydrocarbon having an aromatic ring fused to a naphthenic ring and having a hydrocarbon group containing at least one but not more than two hydrogen atoms combined with the carbon atom bound to the aromatic ring.

A further object of this invention relates to the condensation of 5-isopropylindan at hydrogen transfer conditions.

One embodiment of this invention relates to a hydrogen transfer process which comprises reacting in the presence of an alkylating catalyst a branched-chain olefin-acting compound and a polycyclic hydrocarbon having a saturated ring fused to an aromatic ring and having a hydrocarbon group substituent of at least two carbon atoms having at least one hydrogen atom combined with the carbon atom bound to a nuclear carbon atom of said aromatic ring in meta position to said saturated ring and having at least one replaceable nuclear hydrogen atom on said aromatic ring to form a self-condensation polycyclic hydrocarbon having at least four rings, and recovering said self-condensation polycyclic hydrocarbon.

Another embodiment of this invention relates to a process for producing a polycyclic hydrocarbon having at least four rings per molecule which comprises reacting in the presence of an alkylating catalyst a branched-chain olefin and a polycyclic hydrocarbon having a cycloparaffin ring fused to an aromatic ring and having a hydrocarbon group substituent of at least two carbon atoms containing a hydrogen atom combined with the carbon atom bound to a nuclear carbon atom of said aromatic ring in meta position to said saturated ring and adjacent to another nuclear carbon atom of said aromatic ring having replaceable hydrogen in ortho positions to said substituent to form a self-condensation hydrocarbon having at least four rings, and recovering said self-condensation hydrocarbon.

Still another embodiment of this invention relates to a process for producing a polycyclic hydrocarbon having at least four rings per molecule which comprises reacting in the presence of an alkylating catalyst a branched-chain olefin and a polycyclic hydrocarbon having a cycloparaffin ring fused to an aromatic ring and having a hydrocarbon group substituent of at least two carbon atoms containing a hydrogen atom combined with the carbon atom bound to a nuclear carbon atom of said aromatic ring in meta position to said cycloparaffin ring and adjacent to another nuclear carbon atom of said aromatic ring having a replaceable hydrogen atom in ortho position to said substituent and to said cycloparaffin ring to form a self-condensation hydrocarbon having at least four rings, and recovering said self-condensation hydrocarbon.

Still another embodiment of this invention relates to a process for producing a polycyclic hydrocarbon having four rings per molecule which comprises reacting in the presence of an alkylating catalyst a branched-chain olefin and a polycyclic hydrocarbon having a cycloparaffin ring fused to an aromatic ring and having a hydrocarbon group substituent of at least two carbon atoms containing a hydrogen atom combined with the carbon atom bound to a nuclear carbon atom of said aromatic ring in meta position to said cycloparaffin ring and adjacent to another nuclear carbon atom of said aromatic ring having a replaceable hydrogen atom combined with a nuclear carbon atom of said aromatic ring to form a self-condensation hydrocarbon having four rings, and recovering said self-condensation hydrocarbon.

A further embodiment of this invention relates to a process for producing a trialkylcycloalkaaryl-(perhydrocycloalka)-indan which comprises reacting in the presence of a mineral acid catalyst a branched-chain olefin and a bicyclic hydrocarbon having a saturated ring of at least five and not more than six carbon atoms fused to a benzene ring and with a secondary group combined with said benzene ring in meta position to said saturated ring and with a replaceable nuclear hydrogen atom in ortho position to said alkyl group to form from said bicyclic hydrocarbon a self-condensation product comprising essentially a trialkylcycloalkaaryl-(perhydrocycloalka)-indan, and recovering said trialkylcycloalkaaryl-(perhydrocycloalka)-indan.

A still further embodiment of this invention relates to a process for producing a trimethylcycloalkaaryl-(perhydrocycloalka)-indan which comprises reacting in the presence of a hydrofluoric acid catalyst a branched-chain olefin and a bicyclic hydrocarbon having a saturated ring of at least five and not more than six carbon atoms fused to a benzene ring and with an isopropyl group combined with said benzene ring in meta position to said saturated ring and with a replaceable nuclear hydrogen atom in ortho position to said isopropyl group to form from said bicyclic hydrocabon a self-condensation product comprising essentially a trimethylcycloalkaaryl-(perhydrocycloalka)-indan, and recovering said trimethylcycloalkaaryl-(perhydrocycloalka)-indan.

An additional embodiment of this invention relates to a hydrogen transfer process which comprises reacting in the presence of an acid-acting catalyst a branched-chain olefinic acting compound and a polycyclic fused ring hydrocarbon containing one aromatic ring and an alkyl group substituent of at least two carbon atoms and having at least one hydrogen atom combined with the carbon atom of the alkyl group attached to the aromatic ring, said alkyl group being attached to the carbon atom on the aromatic ring which is two carbon atoms removed from the point of fusion of the aromatic ring to a saturated ring.

A still additional embodiment of this invention relates to a hydrogen transfer process which comprises reacting in the presence of an acid-acting catalyst a branched-chain olefinic acting compound and a polycyclic fused ring hydrocarbon containing one aromatic ring and two saturated group substituents in which at least one of said substituents has at least two carbon atoms and at least one hydrogen atom combined with the carbon atoms of the saturated groups attached to the aromatic ring, said saturated groups being attached to the carbon atoms on the aromatic ring which are one carbon atom removed from the points of fusion of the aromatic ring to a saturated ring.

We have developed a method for effecting a hydrogen transfer between a branched-chain olefinic hydrocarbon and a polycyclic hydrocarbon having a cycloparaffin ring fused to an aromatic ring and also having certain alkyl substituents bound to the aromatic ring. Such polynuclear compounds have one aromatic ring and an alkyl group bound to said aromatic ring. The alkyl groups must have either one or two hydrogen atoms combined with a carbon atom attached to the aromatic ring; this carbon atom is a part of the alkyl group which acts as a hydrogen donor whereas the olefinic hydrocarbon charged to the process is a hydrogen acceptor.

If the alkyl group which acts as a hydrogen donor is in meta position to the fused saturated ring, hydrogen transfer will take place provided that at least one replaceable hydrogen atom is present in the nucleus in ortho position to said alkyl donor, that is, this hydrogen transfer takes place in case the alkyl group has one hydrogen atom bound to the carbon atom of the alkyl group which is attached to the aromatic nucleus. The other alkyl groups that may also be bound to the aromatic nucleus are preferably non-hydrogen donors such as methyl groups.

Thus Compound A which is shown below will not undergo hydrogen transfer to give a 5-ring condensation product because no nuclear hydrogen atoms are available on the aromatic ring in ortho position to the isopropyl group. However, Compound B will react to form a 5-membered ring condensation product because one nuclear hydrogen atom is present in ortho position to the isopropyl group, that is, a nuclear hydrogen atom is combined with the carbon atom which is adjacent to the nuclear carbon atom to which the isopropyl group is joined, the other two positions in the benzene ring being combined with methyl groups as indicated in Formula B.

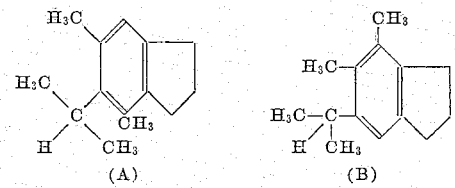

It the alkyl group which acts as a hydrogen donor contains two hydrogen atoms on the carbon atom bound to the aromatic ring, such as a straight-chain alkyl group, then it is necessary that at least one carbon atom on the aromatic nucleus have a replaceable hydrogen atom, this replaceable hydrogen atom preferably being in ortho position to the alkyl group of at least two carbon atoms.

It the alkyl substituent on the aromatic ring is in ortho position to the saturated or cycloparaffin ring, then a substituent in para position to the alkyl group which acts as a hydrogen donor is necessary in order for a hydrogen transfer reaction to take place.

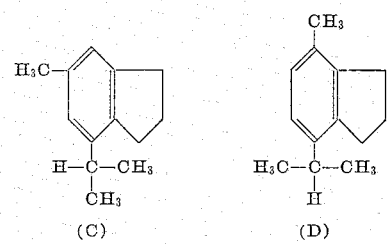

Thus the isopropyl group in Compound C will not act as a hydrogen donor, it being in ortho position to the saturated ring and in meta position to the methyl group, whereas Compound D will undergo hydrogen transfer and the isopropyl group will act as a hydrogen donor, it being in ortho position to the saturated ring and in para position to the methyl group. Compound D will undergo self-condensation to form a 5-membered ring as indicated hereinafter. In Compound D a nuclear hydrogen atom is available in ortho position to the isopropyl group while in Compound E, which is shown below, no readily replaceable hydrogen atom is present in ortho position to the isopropyl group and accordingly a 5-ringed condensation compound is not formed.

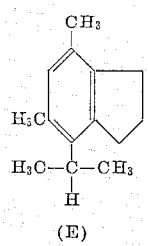

In Compound F, however, in which a normal propyl group is present and one replaceable hydrogen atom is also present on a nuclear carbon atom of the benzene ring, a 4-ringed condensation product will be formed, whereas in Compound G where no replaceable hydrogen atoms are present in the aromatic ring, no condensation product is produced.

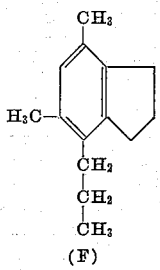
(F)

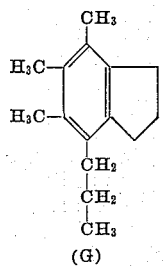
(G)

As a result of the hydrogen transfer reaction, the molecules of certain polycyclic hydrocarbons containing a substituted aromatic ring undergo a self-condensation to form a hydrocarbon of higher molecular weight. A self-condensation of this type is illustrated by the following equations which indicates the course of this hydrogen transfer process when applied to a mixture of 5-isopropylindan and 4-methylcyclohexene-1 to produce hydrocarbons containing five rings per molecule.

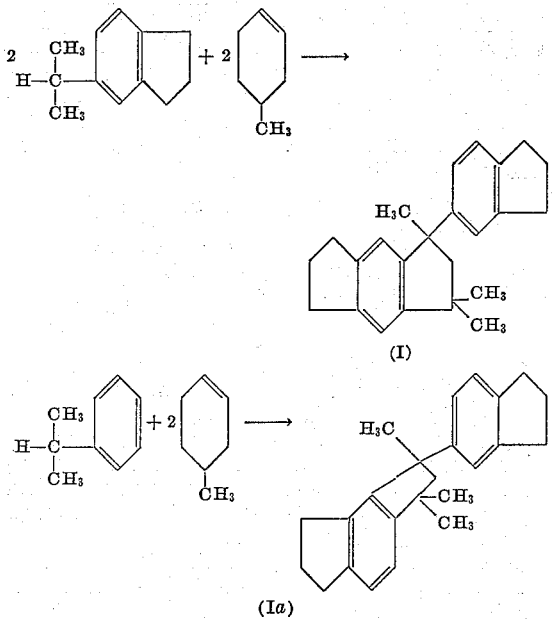

The product (I) of the above indicated reaction may be referred to as: 1,3,3-trimethyl-1-(5'-indano)-5,6 - dihydro-7H-cyclopent[f]indan according to A. M. Patterson and L. T. Capell, "The Ring Index," Reinhold Publishing Corporation, New York, 1940. Similarly, Compound Ia is referred to as 1,3,3-trimethyl-1-(5'-indano)-6,7-dihydro-8H-cyclopent[g]indan.

Similarly, the effect of hydrogen transfer reaction on a mixture of 4-methyl-7-isopropylindan and 4-methylcyclohexene-1 is indicated in the following equation:

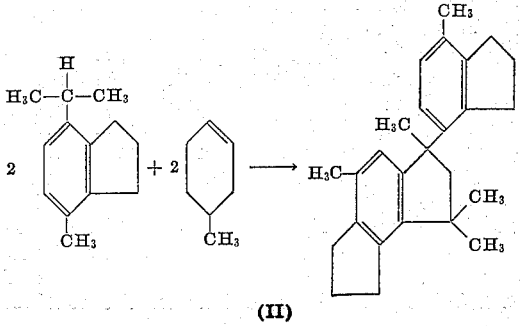
(II)

Hydrocarbon (II) may be referred to as 4,6,8,8-tetramethyl - 6 - (4'-(7'-methylindano))-1,2 - dihydro-3H-cyclopent[e]indan. Compound (II) may also be referred to as 1,3,3,6-tetramethyl-1-(4'-(7'-methylindano)) - cyclopentano-[e]indan, although the first-mentioned name is preferred according to the nomenclature summarized by A. M. Patterson and L. T. Capell, "The Ring Index."

Similarly, the self-condensation of 1,2,3,4-tetrahydro-6-isopropylnaphthalene in the presence of 4-methylcyclohexene and liquid hydrogen fluoride occurs as indicated by the following equation:

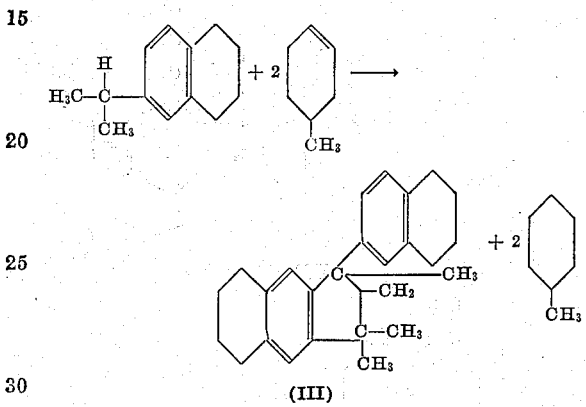
(III)

Hydrocarbon (III) may be referred to as 1,3,3 - trimethyl-1-(6'-(1',2',3',4'-tetrahydronaphtho))-5,6,7,8-tetrahydrocyclohex[f]indan.

The polycyclic hydrocarbons indicated as hydrocarbons (I), (II), and (III) in the above equations are members of a class which may be referred to as trialkylcycloalkaaryl-(perhydrocycloalka)-indan hydrocarbons. They are all very closely related in structures in that they all contain a 1,3,3-trialkylindan nucleus together with a cycloalkanophenyl group (as an indano, cyclopentanophenyl, cyclopentanomethylphenyl, or cyclohexanophenyl group), combined with the 1-carbon atom position of the 1,3,3-trialkylindan nucleus and also with a cyclopentano or cyclohexano group fused to the benzene ring of the 1,3,3-trialkylindan nucleus.

When the bicyclic hydrocarbon starting material contains on its aromatic ring not an isopropyl group substituent in meta position to the saturated ring but has some other secondary alkyl group substituent in said meta position and with a replaceable hydrogen atom combined with the nuclear carbon atom in ortho position to the alkyl group, acting as a hydrogen donor, then the resultant self-condensation product is a 1,3,3-trialkyl-1-(cycloalkanoaryl)-(cycloalkano)-indan in which at least one of said three alkyl groups is an ethyl group or higher alkyl group and the remainder of these three alkyl groups may be methyl. Such compounds are closely related to the 1,3,3-trimethyl-1-(cycloalkanophenyl)-(cycloalkano) - indan hydrocarbons. These trialkylcycloalkanoarylcycloalkanoindan hydrocarbons may also be referred to as trialkylcycloalkaaryl-(perhydrocycloalka)-indan hydrocarbons.

This hydrogen transfer process may be employed also for producing higher molecular weight polycyclic hydrocarbons by interacting a branched-chain olefin and a bicyclic hydrocarbon having a cycloparaffin ring fused to an aromatic ring in which one of the nuclear hydrogen atoms in the aromatic ring in meta position to the saturated ring is replaced by a straight-chain alkyl group such as an ethyl group, a normal propyl group, a normal butyl group, etc. Thus the reaction of 1,2,3,4-tetrahydro-6-n-propyl naphthalene and 4-methylcyclohexene-1 in the presence of hydrogen fluoride catalyst may be represented by one or both of the following equations:

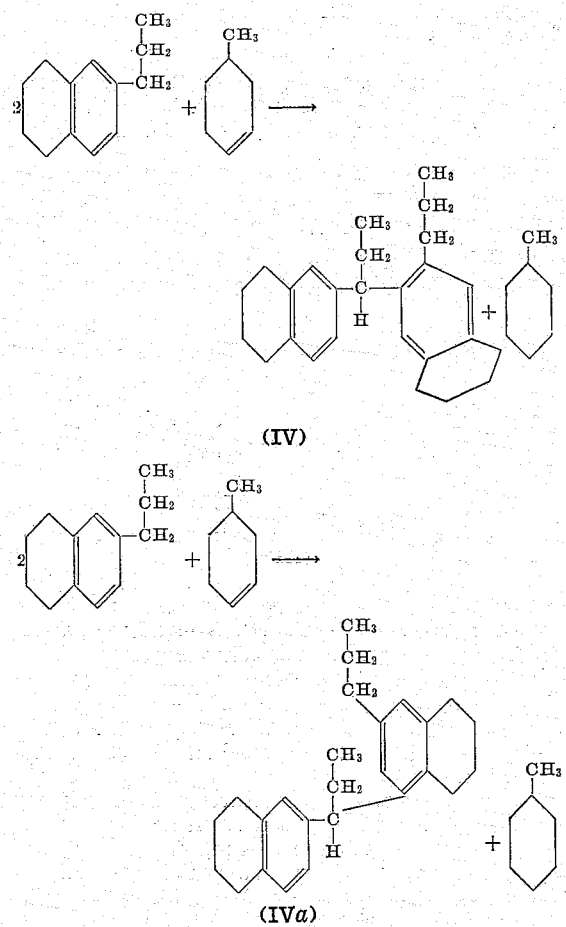

(IV)

(IVa)

Compounds IV and IVa indicated in the above equations may be referred to as:

(IV) 1 - (6' - (1',2',3',4'-tetrahydronaphtho)) - 1 - (6' - (1',2',3',4' - tetrahydro - 7 - n - propylnaphtho))-propane.

(IVa) 1 - (6' - (1', 2', 3', 4' - tetrahydronaphtho)) - 1 - (5' - (1',2',3',4' - tetrahydro - 7' - n-propylnaphtho))-propane.

Hydrogen transfer reactions similar to those resulting in the formation of Compounds IV and IVa also occur when a branched-chain olefin, such as 4-methylcyclohexene-1, and 4-methyl-7-normalpropylindan are reacted at hydrogen transfer conditions as illustrated in the following equation:

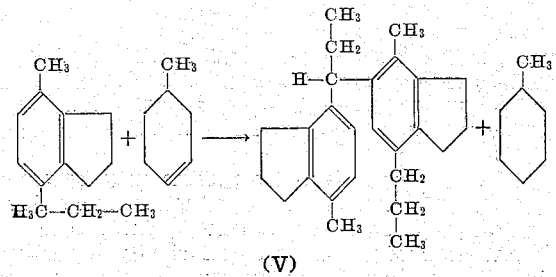

(V)

The resultant Compound V may be referred to as 1 - (4' - (7' - methylindano)) - 1 - (5' - (4' - methyl - 7' - n - propylindano)) - propane. Accordingly, Compounds IV, IVa, and V may be referred to as 1,1-di-(cycloalkanophenyl)-alkanes in which one of the cycloalkanophenyl groups has at least one alkyl substituent more than the other.

Thus when the alkyl group of the bicyclic hydrocarbon starting material, as 1,2,3,4-tetrahydro-6-isopropylnaphthalene or 4-methyl-7-isopropylindan, contains only one hydrogen atom combined with the carbon atom that is attached to the benzene ring, such a bicyclic hydrocarbon undergoes hydrogen transfer with a branched-chain olefin such as methylcyclohexene to form a higher molecular weight polycyclic hydrocarbon containing 5 rings, whereas if the alkyl group is a normal alkyl group, or another group, as an isobutyl group, also having two hydrogen atoms combined with the carbon atom attached to the benzene ring, then two molecules of the alkyl bicyclic hydrocarbon condense to form a higher molecular weight polycyclic hydrocarbon with two bicyclic groups joined by a paraffin bridge.

Although the above-indicated equations illustrate the application of this hydrogen transfer process to bicyclic hydrocarbons which have a benzene ring fused to a cycloparaffin ring such as a cyclopentane ring or a cyclohexane ring, the process is also applicable to other polycyclic aromatic hydrocarbons having a benzene ring fused to a saturated bicyclic or polycyclic ring system. Thus 1,2,3,4,9,10 - hexahydro - 6 - isopropylanthracene which has the formula

may be thought of as containing a decalin or decahydronaphthalene structure fused to a benzene ring, the latter also being combined with an isopropyl group. The 1,2,3,4,9,10-hexahydro-6-isopropylanthracene will thus undergo hydrogen transfer with a branched-chain olefinic hydrocarbon or other olefin-acting compound, to form a higher molecular weight polycyclic hydrocarbon having 7 rings per molecule.

Fused bicyclic or polycyclic hydrocarbons which are utilizable as starting materials in this process contain one aromatic ring while the remaining ring or rings are completely hydrogenated. Also the aromatic ring is substituted by at least one alkyl group which may act as a hydrogen donor in meta position to the fused ring. If two alkyl groups are combined with the aromatic ring and one of the alkyl groups is in meta position to the saturated ring, the other alkyl group, which is a methyl group may occupy any of the other available positions. If however, two alkyl groups are combined with the aromatic ring and one of the alkyl groups acting as a hydrogen donor is attached in ortho position to the fused ring, the other alkyl group must be attached to an ortho position also.

The olefinic hydrocarbons which act as hydrogen acceptors in this process may contain at least one double bond attached to a tertiary carbon atom or such an olefinic carbon atom may be formed in situ. The olefinic starting materials suitable for this process have a branched chain and include such hydrocarbons as trimethylethylene, dihydrolimonene, methylcyclohexene, 1,1,3-trimethylcyclohexene, menthene, other alkylcycloalkenes, etc. The exact type of olefin to be used is dependent on the catalyst and the aromatic hydrocarbon with which the hydrogen transfer is to be effected. Thus n-octene and cyclohexene, namely, olefins not possessing branched chains, when reacted with bicyclic aromatic hydrocarbons at operating conditions similar to those used with the branched-chain olefins, effect alkylation but not hydrogen transfer.

In addition to the branched-chain monoolefins mentioned above, other olefin-acting compounds which are also utilizable in this process comprise conjugated diolefins containing a tertiary carbon atom, alcohols, ethers, esters of carboxylic acids, tertiary alkylphenols, tertiary cycloalkylphenols, and alkyl halides which may be regarded as capable of forming branched-chain olefins in situ in the reaction mixture.

The process as herein described is carried out in the presence of an alkylating catalyst at conditions necessary for the hydrogen transfer reaction. Suitable acid-acting alkylating catalysts include mineral acids, such as sulfuric acid, chlorosulfonic acid, fluorosulfonic acid, hydrogen fluoride, hydroxy borofluoric acids, fluorophosphoric acids, phosphoric acids, Friedel-Crafts halide catalysts, particularly aluminum chloride, aluminum bromine, ferric chloride, zirconium chloride, and boron fluoride, the latter preferably with hydrogen fluoride. Since in some cases Friedel-Crafts catalysts may cause a migration of alkyl groups within the aromatic ring before the hydrogen transfer reaction occurs, it is sometimes advantageous to use Friedel-Crafts complexes, such as etherate, alcoholate, etc. for this reaction.

Phosphoric acid catalysts comprise orthophosphoric acid, and also polyphosphoric acids such as pyrophosphoric acid, triphosphoric acid, and tetraphosphoric acid. Under certain conditions of operation various oxide-type catalysts may be used which include activated clays, silica-alumina composites, and other silica-containing materials which are generally utilizable as catalysts for hydrocarbon cracking.

The operating conditions used in the process are dependent upon the nature of the hydrocarbons being treated and also upon the catalysts employed. When utilizing strong mineral acids, such as hydrogen fluoride, sulfuric acid, a halosulfonic acid as fluorosulfonic acid, chlorosulfonic acid, and the like, and also Friedel-Crafts metal halides as aluminum chloride and aluminum bromide promoted by a hydrogen halide such as hydrogen chloride, the process is carried out at a temperature of from about −30° to about 100° C. and at a pressure up to about 100 atmospheres. However, in the presence of hydrogen fluoride, sulfuric acid, and aluminum chloride, and boron fluoride with hydrogen fluoride catalysts the preferred operating temperature is generally from about 0° to about 50° C. while in contact with ferric chloride catalysts the preferred operating temeperature is from about 50° to about 100° C. Silica-alumina and other synthetic oxide catalysts and clays are generally used at a temperature of from about 200° to about 400° C. and at a superatmospheric pressure generally not in excess of about 100 atmospheres.

Our process is carried out in either batch or continuous operation. In batch operation the usual procedure consists in placing a mineral acid or a Friedel-Crafts catalyst and a portion, generally about 50%, of the aromatic hydrocarbon in a reactor provided with a mechanically driven stirrer, cooling these materials to a temperature of from about 0° to about 10° C. and adding thereto with stirring, a solution of the olefin in the remainder of the aromatic hydrocarbon. The reaction mixture is then separated and the product is washed, dried, and distilled to separate therefrom the resultant higher molecular weight aromatic hydrocarbon. Unconconverted aromatic hydrocarbons recovered in this distillation are utilizable in the further operation of the process.

The process is also carried out in a continuous manner by passing the aromatic and branched-chain olefinic or cycloolefinic hydrocarbon through a suitable reactor in which they are contacted in the presence of the catalyst, the latter either as a liquid or as a solid, depending upon the catalysts such as sulfuric acid, chlorosulfonic acid, or hydrogen fluoride. The catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and cycloolefinic hydrocarbons or other branched-chain olefins are passed therethrough, the resultant hydrocarbon product requires no washing and drying treatment and may be separated by distillation to separate therefrom unconverted aromatic and cycloolefinic hydrocarbons and to recover the desired polycyclic hydrocarbons.

In order to obtain relatively high yields of hydrogen transfer products including higher molecular weight indan hydrocarbons or of arylalkane hydrocarbons by our process, it is necessary to use rather carefully selected hydrocarbon fractions as charging stocks. As already indicated herein, only certain types of aromatic hydrocarbons, namely, those containing particular substituents are utilizable as starting materials in this process. Also an olefin which does not have a branched-chain structure such as is present in trimethylethylene, dihydrolimonene, methylcyclohexene, etc. acts as an alkylating agent for the aromatic hydrocarbon also charged to the process. Accordingly, in order to obtain hydrogen transfer rather than alkylation, it is necessary to use a branched-chain olefinic hydrocarbon together with the aforementioned substituted bicyclic hydrocarbons containing fused aromatic and cycloparaffinic rings.

The polycyclic hydrocarbon condensation products formed in the process are useful as intermediates in organic synthesis such as in the production of dyes, pharmaceuticals, insecticides, plastics, etc. Thus these polycyclic hydrocarbons may be converted into useful dyes by a combination of nitration, reduction and coupling reactions. Also chlorination of these polycyclic hydrocarbons produces insecticides effective against mites, lice, ticks, clothes moths, etc.

The following example is given to illustrate the character of results obtained by the use of a specific embodiment of the present invention, although the data presented are not introduced with the intention of unduly restricting the generally broad scope of the invention.

Anhydrous hydrogen fluoride (97 grams) and 70 grams of 5-isopropyl-2,3-dihydroindene (also generally called 5-isopropylindan) were placed in a copper reactor provided with a mechanically driven stirrer and cooled externally by an ice bath to 0° C. The reaction mixture was stirred and to it was added a solution consisting of 43 grams of 3-methylcyclohexene and 70 grams of 5-isopropylindan, the latter previously prepared by alkylating indan with propylene in the presence of an acid catalyst. After the addition of the mixture of 3-methylcyclohexene and 5-isopropylindan was completed, the resultant reaction mixture was poured into ice, previously cooled to −30° C., the hydrocarbon material was recovered, and then washed, dried, and distilled. Upon distilling 161 grams of the washed and dried hydrocarbon product, the first distillate recovered at atmospheric pressure was 20 grams of methylcyclohexane formed in the hydrogen transfer reaction. The remainder of the reaction product was distilled at a pressure of 4 mm. of mercury and separated into fractions having the following points and refractive indices.

| Boiling Point, ° C. at 4 mm. | Weight, grams | $n_D^{20}$ |
|---|---|---|
| 75–80 | 29 | 1.5220 |
| 80–156 | 18 | 1.5095 |
| 156–190 | 11 | 1.5417 |
| 190–195 | 49 | 1.5650 |
| Residue | 20 | |

Fraction 1 corresponded to recovered 5-isopropylindan and Fraction 2 corresponded to cycloalkylated indan. Fractions 4 to 6 corresponded to a product of the condensation of two molecules of 5-ispropylindan with the liberation of a molecule of hydrogen. Analysis of the hydrocarbon material contained in Fractions 4 to 6 showed 90.50% by weight of carbon and 9.40% by weight of hydrogen, these analytical values corresponding closely to 90.57% by weight of carbon and 9.43% by weight of hydrogen calculated for the formula $C_{24}H_{30}$. The hydrocarbon condensation product present in Fractions 4 to 6 was 1,3,3-trimethyl-1-(5'-indano)-5,6-dihydro-7H-cyclopent[f]indan.

We claim as our invention:

1. A hydrogen transfer process which comprises reacting in the presence of an alkylating catalyst a branched-chain olefin and a polycyclic hydrocarbon containing a single aromatic ring and a saturated ring fused to said aromatic ring and having a hydrocarbon group substituent of at least two carbon atoms having at least one hydrogen atom combined with the carbon atom bound to a nuclear carbon atom of said aromatic ring in meta position to said saturated ring and having at least one nuclear hydrogen atom on said aromatic ring to form a self-condensation polycyclic hydrocarbon having at least four rings, and recovering said self-condensation polycyclic hydrocarbon.

2. A process for producing a polycyclic hydrocarbon having at least four rings per molecule which comprises reacting in the presence of an alkylating catalyst a branched-chain olefin and a polycyclic hydrocarbon containing a single aromatic ring and a cycloparaffin ring fused to said aromatic ring and having a hydrocarbon group substituent of at least two carbon atoms containing a hydrogen atom combined with the carbon atom bound to a nuclear carbon atom of said aromatic ring in meta position to said saturated ring and adjacent to another nuclear carbon atom of said aromatic ring having hydrogen in ortho positions to said substituent to form a self-condensation hydrocarbon having at least four rings, and recovering said self-condensation hydrocarbon.

3. A process for producing a polycyclic hydrocarbon having at least four rings per molecule which comprises reacting in the presence of an alkylating catalyst a branched-chain olefin and a polycyclic hydrocarbon containing a single aromatic ring and a cycloparaffin ring fused to said aromatic ring and having a hydrocarbon group substituent of at least two carbon atoms containing a hydrogen atom combined with the carbon atom bound to a nuclear carbon atom of said aromatic ring in meta position to said cycloparaffin ring and adjacent to another nuclear carbon atom of said aromatic ring having a hydrogen atom in ortho position to said substituent and to said cycloparaffin ring to form a self-condensation hydrocarbon having at least four rings, and recovering said self-condensation hydrocarbon.

4. A process for producing a polycyclic hydrocarbon having four rings per molecule which comprises reacting in the presence of an alkylating catalyst a branched-chain olefin and a polycyclic hydrocarbon containing a single aromatic ring and a cycloparaffin ring fused to said aromatic ring and having a hydrocarbon group substituent of at least two carbon atoms containing a hydrogen atom combined with the carbon atom bound to a nuclear carbon atom of said aromatic ring in meta position to said cycloparaffin ring and adjacent to another nuclear carbon atom of said aromatic ring having a hydrogen atom combined with a nuclear carbon atom of said aromatic ring to form a self-condensation hydrocarbon having four rings, and recovering said self-condensation hydrocarbon.

5. A process for producing a polycyclic hydrocarbon having four rings per molecule which comprises reacting in the presence of an acid-acting alkylating catalyst a branched-chain olefin and a bicyclic hydrocarbon having a cycloparaffin ring fused to a benezene ring and having a hydrocarbon group substituent of at least two carbon atoms containing two hydrogen atoms combined with the carbon atom bound to a nuclear carbon atom of said benzene ring in meta position to said cycloparaffin ring and adjacent to another nuclear carbon atom of said benzene ring having a nuclear hydrogen atom in ortho position to said substituent to form a self-condensation hydrocarbon having four rings, and recovering said self-condensation hydrocarbon.

6. A process for producing a polycyclic hydrocarbon having five rings per molecule which comprises reacting in the presence of an acid-acting alkylating catalyst a branched-chain olefin and a bicyclic hydrocarbon having a cycloparaffin ring fused to a benzene ring and having a hydrocarbon group substituent of at least three carbon atoms containing only one hydrogen atom combined with the carbon atom bound to a nuclear carbon atom of said benzene ring in meta position to said cycloparaffin ring and adjacent to another nuclear carbon atom of said benzene ring having a hydrogen atom in ortho position to said substituent to form a self-condensation hydrocarbon having five rings, and recovering said self-condensation hydrocarbon.

7. A process for producing a polycyclic hydrocarbon having at least four and not more than five rings per molecule which comprises reacting in the presence of a mineral acid catalyst at a temperature of from about −30° to about 100° C. a branched-chain olefin and a bicyclic hydrocarbon having a cycloparaffin ring fused to a benzene rings and having a hydrocarbon group substituent of at least two carbon atoms containing a hydrogen atom combined with the carbon atom bound to a nuclear carbon atom of said benzene ring in meta position to said cycloparaffin ring and adjacent to another nuclear carbon atom of said benzene ring having a nuclear hydrogen atom in ortho position to said cycloparaffin ring to form a self-condensation hydrocarbon having at least four and not more than five rings, and recovering said self-condensation hydrocarbon.

8. The process defined in claim 7 further characterized in that said catalyst comprises hydrofluoric acid.

9. The process defined in claim 7 further characterized in that said catalyst comprises sulfuric acid.

10. A hydrogen transfer process which comprises reacting in the presence of an acid-acting catalyst a branched-chain olefin and a polycyclic fused ring hydrocarbon containing one aromatic ring and an alkyl group substituent of at least two carbon atoms and having at least one hydrogen atom combined with the carbon atom of the alkyl group attached to the aromatic ring, said alkyl group being attached to the carbon atom on the aromatic ring which is two carbon atoms removed from the point of fusion of the aromatic ring to a saturated ring.

11. A process for producing a trialkylcycloalkaaryl-(perhydrocycloalka)-indan which comprises reacting in the presence of a mineral acid catalyst a branched-chain olefin and a bicyclic hydrocarbon having a saturated ring of at least five and not more than six carbon atoms fused to a benzene ring and with a secondary alkyl group combined with said benzene ring in meta position to said saturated ring and with a replaceable nuclear hydrogen atom in ortho position to said secondary alkyl group to form from said bicyclic hydrocarbon a self-condensation product comprising essentially a trialkylcycloalkaaryl-(perhydrocycloalka)-indan, and recovering said trialkylcycloalkaaryl-(perhydrocycloalka)-indan.

12. A process for producing a trimethylcycloalkaaryl-(perhydrocycloalka)-indan which comprises reacting in the presence of a hydrofluoric acid catalyst a branched-chain olefin and a bicyclic hydrocarbon having a saturated ring of at least five and not more than six carbon atoms fused to a benzene ring and with an isopropyl group combined with said benzene ring in meta position to said saturated ring and with a replaceable nuclear hydrogen atom in ortho position to said isopropyl group to form from said bicyclic hydrocarbon a self-condensation product comprising essentially a trimethylcycloalkaaryl-(perhydrocycloalka)-indan, and recovering said trimethylcycloalkaaryl-(perhydrocycloalka)-indan.

13. A process for producing 1,3,3-trimethyl-1-(5'-indano)-5,6-dihydro-7H-cyclopent[f]indan which comprises reacting 5-isopropylindan and a branched-chain olefin in the presence of a hydrofluoric acid catalyst at a temperature of from about −30° to about +100° C. to form from said isopropylindan a self-condensation product comprising essentially 1,3,3-trimethyl-1-(5'-indano)-5,6-dihydro-7H-cyclopent[f]indan, and recovering said 1,3,3-trimethyl-1-(5'-indano)-5,6-dihydro-7H-cyclopent[f]indan.

14. A process for producing 1,3,3-trimethyl-1-(6' - (1',2',3',4' - tetrahydronaphtho)) - 5,6,7,8 - tetrahydrocyclohex[f]indan which comprises reacting 1,2,3,4-tetrahydro-6-isopropylnaphthalene and a branched-chain olefin in the presence of a hydrofluoric acid catalyst at a temperature of from about −30° to about 100° C. to form from said 1,2,3,4-tetrahydro-6-isopropylnaphthalene a self-condensation product comprising essentially 1,3,3 - trimethyl - 1 - (6' - (1',2',3',4' - tetrahydronaphtho)) - 5,6,7,8 - tetrahydrocyclohex[f]indan, and recovering said 1,3,3-trimethyl-1-(6' - (1',2',3',4' - tetrahydronaphtho)) - 5,6,7,8-tetrahydrocyclohex[f]indan.

15. A 1,2,3 - trialkyl - 1 - (cycloalkanophenyl)-(cycloalkano)-indan.

16. 1,3,3 - trimethyl - 1 - (5' - indano) - 5,6-dihydro-7H-cyclopent[f]indan.

17. 4,6,8,8 - tetramethyl - 6 - (4' - (7' - methylindano))-1,2-dihydro-3H-cyclopent[e]indan.

18. 1,3,3 - trimethyl - 1 - (6' - (1',2',3',4'-tetrahydronaphtho)) - 5,6,7,8 - tetrahydrocyclohex[f]indan.

19. A trialkylcycloalkaaryl - (perhydrocycloalka)-indan hydrocarbon.

HERMAN PINES.
VLADIMIR N. IPATIEFF.

References Cited in the file of this patent

UNITED STATES PATENTS

| Number | Name | Date |
|---|---|---|
| 2,258,394 | Tinker et al. | Oct. 7, 1941 |
| 2,406,645 | Thomas | Aug. 27, 1946 |
| 2,420,143 | Mattox | May 6, 1947 |